US011920043B2

(12) United States Patent
Kim et al.

(10) Patent No.: US 11,920,043 B2

(45) Date of Patent: Mar. 5, 2024

(54) METHOD OF MANUFACTURING NON-SINTERED LIQUID METAL INK

(71) Applicant: KOREA ADVANCED INSTITUTE OF SCIENCE AND TECHNOLOGY, Daejeon (KR)

(72) Inventors: Hyoung Soo Kim, Daejeon (KR); Kwang Seok Park, Daejeon (KR); Jeong Su Pyeon, Daejeon (KR); Hye Jun Jeon, Daejeon (KR)

(73) Assignee: KOREA ADVANCED INSTITUTE OF SCIENCE AND TECHNOLOGY, Daejeon (KR)

( * ) Notice: Subject to any disclaimer, the term of this patent is extended or adjusted under 35 U.S.C. 154(b) by 0 days.

(21) Appl. No.: 17/768,708

(22) PCT Filed: Dec. 24, 2021

(86) PCT No.: PCT/KR2021/019827

§ 371 (c)(1),
(2) Date: Apr. 13, 2022

(87) PCT Pub. No.: WO2022/154312

PCT Pub. Date: Jul. 21, 2022

(65) Prior Publication Data

US 2023/0159771 A1 May 25, 2023

(30) Foreign Application Priority Data

Jan. 14, 2021 (KR) ........................ 10-2021-0005073

(51) Int. Cl.
*C09D 11/037* (2014.01)
*B22F 1/054* (2022.01)
(Continued)

(52) U.S. Cl.
CPC ............ *C09D 11/037* (2013.01); *B22F 1/054* (2022.01); *B22F 9/08* (2013.01); *C09D 7/80* (2018.01);
(Continued)

(58) Field of Classification Search
CPC .................................................... C09D 11/037
See application file for complete search history.

(56) References Cited

U.S. PATENT DOCUMENTS

2009/0242854 A1 10/2009 Li et al.
2012/0251736 A1 10/2012 Hong et al.
(Continued)

FOREIGN PATENT DOCUMENTS

CN 108384327 A 8/2018
KR 10-2012-0110554 A 10/2012
(Continued)

OTHER PUBLICATIONS

Translation of International Search Report issued in PCT/KR2021/019827, dated Apr. 11, 2022.

*Primary Examiner* — William D Young
(74) *Attorney, Agent, or Firm* — MEDLER FERRO WOODHOUSE & MILLS PLLC

(57) ABSTRACT

The present invention relates to a method of manufacturing non-sintered liquid metal ink, and more particularly, to a method of manufacturing liquid metal ink manufactured without a sintering process. The method of manufacturing liquid metal ink according to an embodiment of the present invention includes: (a) inputting a solvent into liquid metal in a container at room temperature; (b) performing oxide film-removing treatment on the liquid metal of step (a); and (c) dispersing the liquid metal that has undergone step (b) in a form of nanoparticles through ultrasonic treatment.

7 Claims, 7 Drawing Sheets

Wetting improvement
Crack prevention treatment
Oxide film-removing treatment
Input liquid metal
Ultrasonic treatment
Liquid metal ink

(51) Int. Cl.

| | |
|---|---|
| ***B22F 9/08*** | (2006.01) |
| ***C09D 7/80*** | (2018.01) |
| ***C09D 11/033*** | (2014.01) |
| ***C09D 11/106*** | (2014.01) |
| ***C09D 11/52*** | (2014.01) |

(52) U.S. Cl.
CPC .......... *C09D 11/033* (2013.01); *C09D 11/106* (2013.01); *C09D 11/52* (2013.01); *B22F 2202/01* (2013.01); *B22F 2304/05* (2013.01)

(56) References Cited

U.S. PATENT DOCUMENTS

| | | | | |
|---|---|---|---|---|
| 2013/0244037 | A1* | 9/2013 | Hohman | B22F 9/082 428/402.2 |
| 2020/0040230 | A1* | 2/2020 | Vella | H01B 1/02 |

FOREIGN PATENT DOCUMENTS

| | | | |
|---|---|---|---|
| KR | 10-2013-0051024 | A | 5/2013 |
| KR | 10-1635849 | B1 | 7/2016 |
| KR | 10-1993813 | B1 | 6/2019 |

* cited by examiner

Paper (porous material and fiber application)
Latex (Sportswear Application)
PDMS (biochip application)
FIG. 3
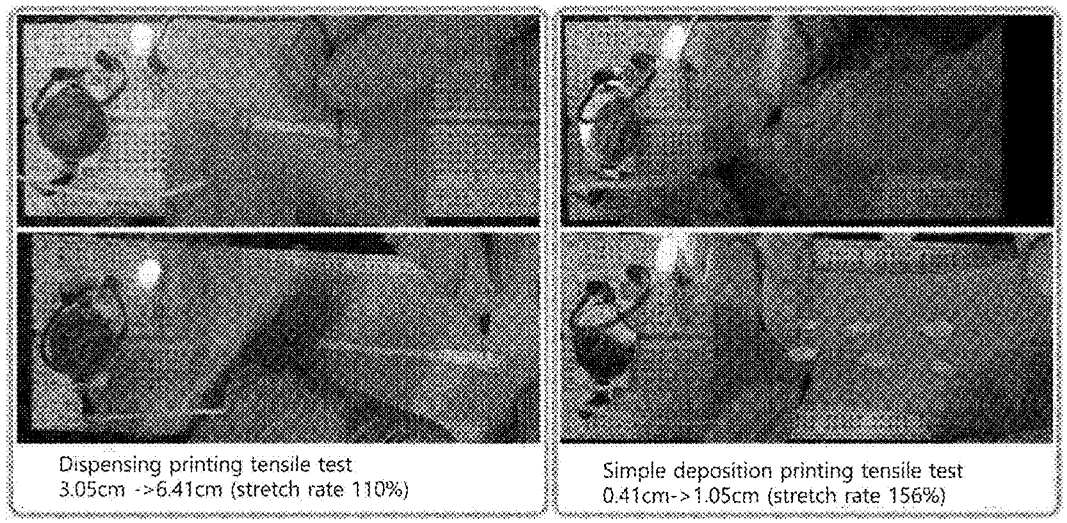
FIG. 4
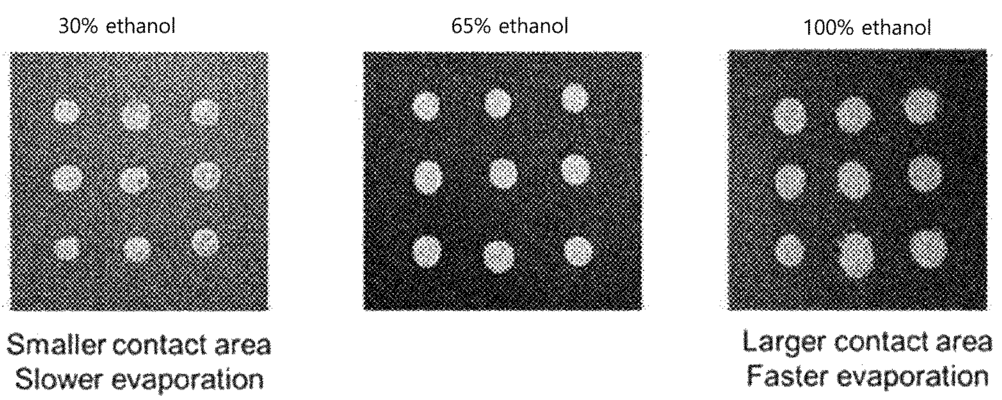
FIG. 5

METHOD OF MANUFACTURING NON-SINTERED LIQUID METAL INK

TECHNICAL FIELD

The present invention relates to a method of manufacturing non-sintered liquid metal ink for flexible electric/electronic devices, and more particularly, to a method of manufacturing liquid metal ink, which is able to manufacture liquid metal ink without a sintering process.

BACKGROUND

Unless otherwise indicated herein, the contents described in this section are not prior art to the claims of the present application, and inclusion in this section is not admitted to be the prior art.

Recently, as the market size for wearable devices has been increased, in order to reduce process costs and time in forming a wiring or an electrode of electronic elements, which are essential for reduction in a size and weight, and flexibility of wearable devices, a market related to printing techniques for electronics such as direct printing of metal particles is also growing together.

In the printing techniques for electronics, liquid ink containing electrically conductive powder is used, and many studies have been conducted on metal materials such as platinum, silver, copper, and aluminum with a high electrical conductivity.

In the case of a substrate printed using such metals, when an external pressure is applied thereto, electrical conductivity is lost or properties thereof are changed. Therefore, it is not easy to implement an electronic element having elasticity while maintaining electrical conductivity even if the shape thereof is changed due to bending, folding or the like. Accordingly, many attempts have been made to utilize liquid metal capable of maintaining a liquid phase at room temperature for the printed board.

As used herein, the liquid metal is defined as a metallic material which maintains the liquid phase even at room temperature due to its low melting point, and is divided into liquid metal including a single element such as mercury or radium and liquid metal including a gallium-based alloy such as a gallium-indium alloy. The liquid metal, particularly gallium-based liquid metal, known as a next-generation material with all the mechanical, physical, chemical and biological stabilities, has a high electrical conductivity and exists in a liquid phase at room temperature. Therefore, if the liquid metal is injected into an appropriate polymer mold, a super-stretchable electrode can be manufactured, which gives remarkably high utilization of the liquid metal.

However, when liquid metal is utilized as an ink for printing on the wiring or the electrode, there is a problem that an oxide film is formed on the surface of the ink, thereby losing the electrical conductivity. Accordingly, in order to remove the oxide film formed on the surface of the ink, it is necessary to undergo a sintering process in which heat or pressure is applied thereto. To remove the oxide film, the liquid metal with the oxide film can be pressed or heated with a hot plate, oven, furnace, laser beam or the like. In case of sintering by applying heat, there is an advantage in that high conductivity is expressed after sintering, but there is a disadvantage in that the liquid metal may be used only for a substrate with little thermal deformation, and it is difficult to use for a substrate with flexibility, i.e., a flexible substrate.

In addition, since the sintering process for removing the oxide film formed on the surface of the liquid metal is a process which should be performed as a post-treatment process, additional time and costs are required for the post-treatment process. Further, there is an inconvenience of having to selectively apply an appropriate sintering method depending on types of the substrate, such that simplification of the process by shortening the process time and reducing costs is required.

SUMMARY OF INVENTION

Problems to be Solved by Invention

It is an object of the present invention to provide a method of manufacturing liquid metal ink for flexible electrical/electronic devices, which is able to manufacture liquid metal ink without a sintering process necessary for removing an oxide film in a process of dispersing liquid metal in a form of nanoparticles in a solvent through ultrasonic waves to manufacture ink.

In addition, it is not limited to the technical problems as described above, and it is obvious that another technical problem may be derived from the following description.

Means for Solving Problems

To achieve the above object, according to an aspect of the present invention, there is provided a method of manufacturing liquid metal ink including: (a) inputting a solvent into liquid metal in a container at room temperature; (b) performing oxide film-removing treatment on the liquid metal of step (a); and (c) dispersing the liquid metal that has undergone step (b) in a form of nanoparticles through ultrasonic treatment.

According to a preferred feature of the present invention, in the step (b), a trace amount of acid may be input into the liquid metal in the container.

According to a preferred feature of the present invention, the method may further include inputting a surfactant or a conductive polymer for preventing cracks of the liquid metal, after the step (a).

According to a preferred feature of the present invention, the method may further include inputting polyvinylpyrrolidone to improve a coating quality of the liquid metal, after the step (a).

According to a preferred feature of the present invention, the method may further include: primarily dispersing the liquid metal in a form of nanoparticles through ultrasonic treatment, after the step (a); and re-dispersing the dispersed liquid metal through secondary ultrasonic treatment, after performing the step (b).

According to a preferred feature of the present invention, the solvent in the step (a) may include a 30 to 65% ethanol aqueous solution.

According to a preferred feature of the present invention, in the step (b), a degree (X) of removing an oxide film from the liquid metal is calculated by the following equation:

$$X = \frac{10^{-pH_{Dispersion\ medium}} - 10^{-pH_{Ink}}}{10^{-pH_{Dispersion\ medium}}}$$

(wherein, $10^{-pH_{Dispersion\ medium}}$ is a hydrogen ion concentration of a dispersion medium including the ethanol aqueous solution in which ethanol and water are mixed, and $10^{-pH_{Ink}}$ is a hydrogen ion concentration value of ink manufactured in a state in which liquid metal is dispersed into the ethanol aqueous solution in which ethanol and water are mixed).

Advantageous Effects

According to the present invention, there are advantages as follows. Printing through the liquid metal may provide better flexibility for a biaxial deformation than that of the case of metal thin film deposition, and since the liquid metal exists in a liquid phase, it is possible to prevent pattern shape and conductivity from being lost through spontaneous repairing properties despite physical deformation of the substrate.

In addition, in the existing metallic ink, a post-treatment process called sintering is essentially performed for removing an oxide film formed thereon, whereas the present invention can omit the sintering process through oxide film-removing treatment, which is possible to reduce the process costs and time while maintaining a high electrical conductivity, and prevent the substrate and pattern from being damaged due to sintering in advance.

Further, the liquid metal ink according to the present invention may be integrated with the existing printing technique to be applied to a flexible electronic device or wearable device.

The effects of the present invention are not limited to the above advantages, and those skilled in the art should understand that it includes all effects that can be deduced from the detailed description of the present invention or the configurations of the invention described in the claims.

BRIEF DESCRIPTION OF DRAWINGS

FIG. 3 is photographs illustrating an energizing test in various substrates, in the method of manufacturing liquid metal ink according to an embodiment of the present invention.

FIG. 4 is photographs illustrating an energizing test according to a tensile test in a state in which ink is printed on a latex board, in the method of manufacturing liquid metal ink according to an embodiment of the present invention.

FIG. 5 is photographs for comparing pattern images of inks according to various ethanol aqueous solutions, in the method of manufacturing liquid metal ink according to an embodiment of the present invention.

MODE FOR CARRYING OUT INVENTION

Figure 1:
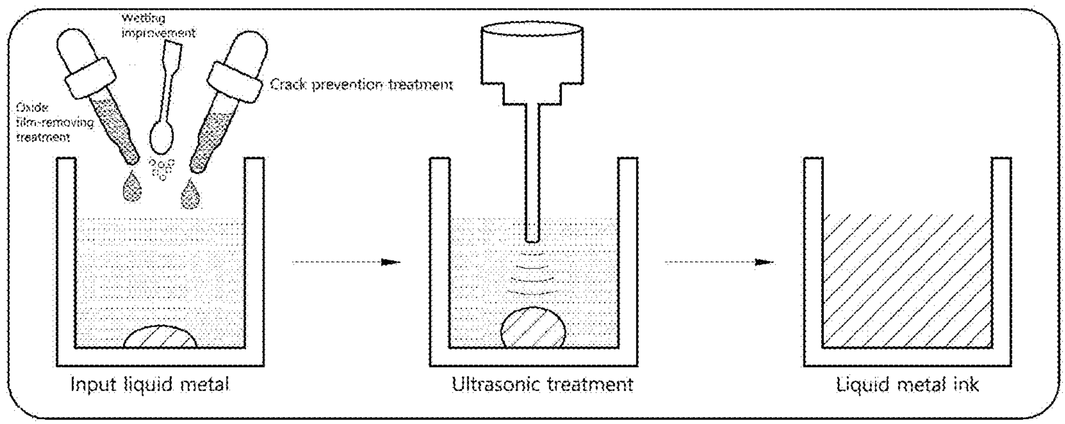
FIGS. 1 and 2 are views schematically illustrating a method of manufacturing liquid metal ink according to an embodiment of the present invention.
Figure 2:
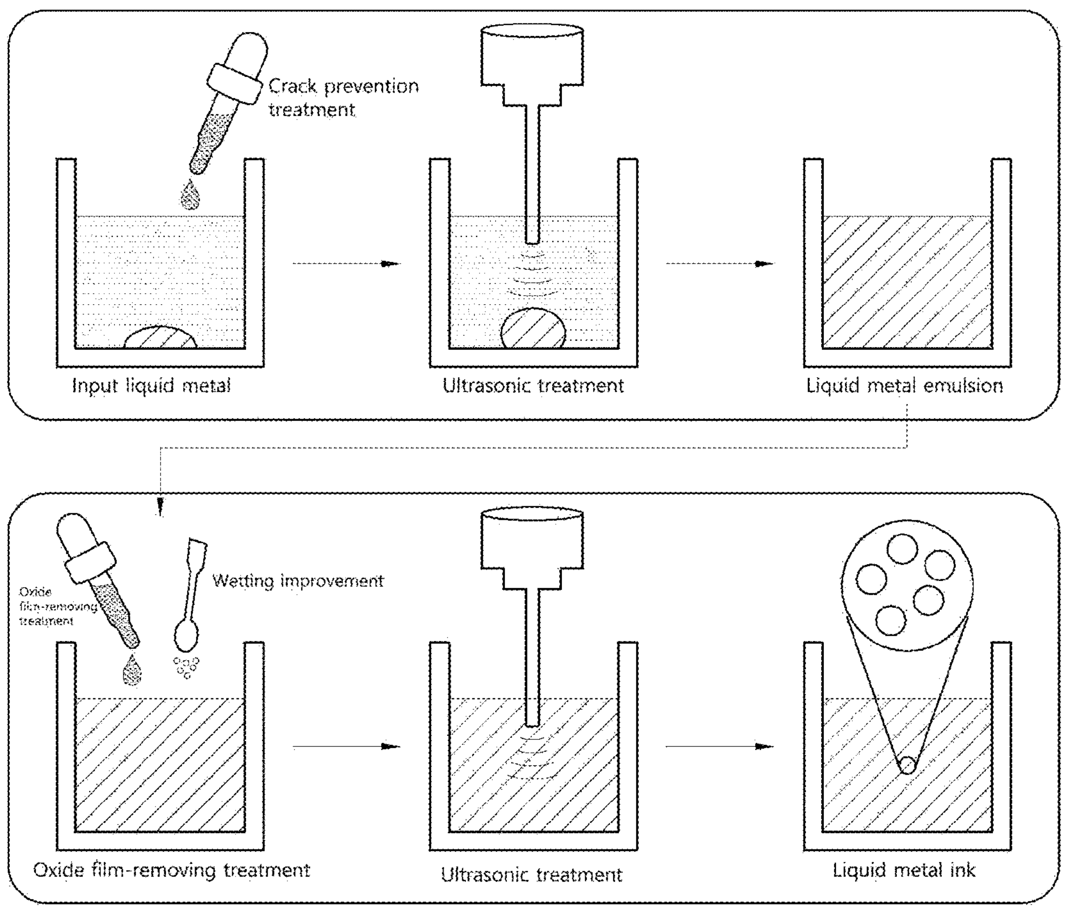

A method of manufacturing liquid metal ink according to an embodiment of the present invention includes: (a) inputting a solvent into liquid metal in a container at room temperature; (b) performing oxide film-removing treatment on the liquid metal of step (a); and (c) dispersing the liquid metal that has undergone step (b) in a form of nanoparticles through ultrasonic treatment.

Hereinafter, configurations, operations, and effects of a method of manufacturing liquid metal ink according to preferred embodiments will be described with reference to the accompanying drawings. For reference, in the drawings described below, each component is omitted or schematically illustrated for convenience and clarity, and the size of each component does not reflect an actual size. In addition, the same reference numerals are denoted to the same components throughout the specification, and reference numerals for the same components in individual drawings will be omitted.

The method of manufacturing liquid metal ink according to an embodiment of the present invention may include: (a) inputting a solvent into room temperature liquid metal contained in a container; (b) performing oxide film-removing treatment on the liquid metal of step (a); and (c) dispersing the liquid metal that has undergone step (b) in a form of nanoparticles through ultrasonic treatment.

In the conventional process of manufacturing ink using metal, since a reduction in the electrical conductivity occurs due to an oxide film formed around the metal, a sintering process for removing the oxide film should be necessarily performed. For the post-treatment process called sintering, adding either a pressing process or a heating process is required. To solve this problem, the present invention is intended to provide a method of manufacturing non-sintered liquid metal ink for process simplification. First, the inventive method includes the step of inputting liquid metal in a container, and inputting a solvent into the container. In this case, the liquid metal used herein is a metallic material which maintains a liquid phase at room temperature, and may include liquid metal made of a single element such as mercury or gallium, or liquid metal made of a gallium-based alloy such as a gallium-indium alloy, but it is limited thereto. In the present disclosure, a gallium-indium-tin alloy (Galinstan) is preferably used.

Next, a solvent is input into the container containing the liquid metal added thereto. Herein, the solvent may include an ethanol aqueous solution in which absolute ethanol and water are mixed, and specifically, may include a 65% ethanol aqueous solution in which 65% of ethanol and 35% of water are mixed, or a 30% ethanol aqueous solution in which 30% of ethanol and 70% of water are mixed, but it is not limited thereto. In addition to the ethanol aqueous solution, various alcohol solvents such as methanol, ethanol, IPA, and etc. may be used. In this way, in the state in which the liquid metal is contained in the solvent, conventionally, the liquid metal is dispersed in the form of nanoparticles through ultrasonic treatment. However, in the present disclosure, the step of removing the oxide film is performed before the ultrasonic treatment step.

According to a preferred feature of the present invention, in the step of removing the oxide film, a trace amount of acid may be input into the liquid metal in the container.

In the step of removing the oxide film, the oxide film formed on the liquid metal is preferentially removed by inputting the trace amount of acid (hydrochloric acid is used in the present disclosure) in a state in which the liquid metal is contained in the container, and then the liquid metal contained in the solvent is subjected to ultrasonic treatment, such that the step of sintering the oxide film of the liquid metal dispersed in nanoparticles may be omitted. The liquid metal that has been subjected to ultrasonic treatment and dispersed in the nanoparticles may be manufactured as an emulsion ink to be used in various ways, such as a coating or a printing technique. The non-sintering liquid metal ink formed through the above-described method has advantages in that it has superior electrical conductivity compared to conventional carbon paste or conductive polymer-based conductive inks, and it is free to deform due to mechanical stimuli such as stretching or shrinkage compared to the ink composed of solid particles at room temperature.

According to a preferred feature of the present invention, the inventive method may further include the step of inputting a surfactant or a conductive polymer for preventing cracks of the liquid metal, after the step of inputting the solvent to the container containing the liquid metal.

In the process of printing the emulsion ink in which the liquid metal is dispersed in the form of nanoparticles through ultrasonic treatment, the ink composed of nanoparticles is a colloidal form, where a problem of the cracks may occur when forming a colloidal deposition after evaporation. In particular, there are problems in that, in the ink composed of metal-based nanoparticles, the dispersed metal particles have a high density, thereby colloidal particles may be precipitated, and in the case of liquid metal, merging between emulsions occurs due to its own high surface tension, and dispersion stability may be reduced over time. Accordingly, as one embodiment to prevent the above-described problems, the inventive method may further include the step of inputting a surfactant or a conductive polymer, after the solvent is input into the liquid metal. The surfactant may include a cationic surfactant such as cetrimonium bromide (CTAB), lysozyme protein (Lys), poly(4-vinyl-1-methyl-pyridinium bromide) (P4VMPB), etc., and the conductive polymer may include a water-soluble conductive polymer such as a poly(3,4-ethylenedioxythiophene)-polystyrenesulfonic acid (PEDOT-PSS) copolymer, polypyrrole-polystyrenesulfonic acid (PPY-PSS) copolymer, etc. When inputting the surfactant or the conductive polymer, an occurrence of microcracks may be prevented in advance and dispersion stability may be increased.

According to a preferred feature of the present invention, the inventive method may further include the step of inputting polyvinylpyrrolidone to improve a coating quality of the liquid metal, after the step (a).

Figure 15:
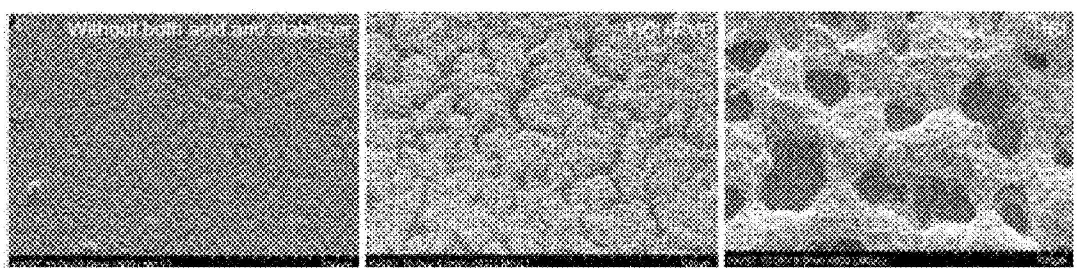
FIG. 15 is photographs illustrating patterns for three types of inks including ink requiring sintering, non-sintered ink, and only acid-added ink, in the method of manufacturing liquid metal ink according to an embodiment of the present invention.

FIG. 15 is photographs illustrating patterns for three types of inks including ink requiring sintering, non-sintered ink, and only acid-added ink. Herein, the non-sintered liquid metal ink and the acid-added ink, generally had a larger particle diameter than the particle diameter of the liquid metal ink requiring sintering. In addition, although there is electrical conductivity even when acid is added, holes appeared in the pattern as shown in the right photograph of FIG. 15, and large droplets having several hundreds of micrometers were found due to excessive merging between droplets, and consequently, it showed an incomplete appearance, for example, a uniform pattern was not formed. However, after inputting the solvent to the liquid metal, when adding polyvinylpyrrolidone thereto, the pore formation of the pattern was largely reduced, and the quality of the pattern was improved, for example, no large droplets were found.

According to a preferred feature of the present invention, the inventive method may further include the step of primarily dispersing the liquid metal in the solvent through ultrasonic treatment, and re-dispersing the dispersed liquid metal through secondary ultrasonic treatment after performing the step of removing the oxide film.

In this case, due to the step of removing the oxide film by adding the acid, briefly, an oxide film-removing treatment, the surface tension of the liquid metal is increased, and thus there was a problem in that a stronger ultrasonic wave should be used when dispersing the liquid metal in the nanoparticles through ultrasonic treatment. Accordingly, power required for an ultrasonic device and heat generated by the ultrasonic wave would be increased. In order to prevent this problem, the oxide film-removing treatment is not performed immediately after inputting the solvent into the liquid metal in the container, but the oxide film is removed through the oxide film-removing treatment in which the liquid metal is primarily dispersed in the form of nanoparticles through ultrasonic treatment, and acid is added into the resulting emulsion ink, and then the dispersed liquid metal is re-dispersed through secondary ultrasonic treatment. Accordingly, there is an advantage in that it is possible to reduce the excessive use of power in the ultrasonic device and decrease the amount of heat generated by the ultrasonic wave.

According to a preferred feature of the present invention, the solvent in the step (a) may include 30 to 65% ethanol aqueous solution.

Figure 16:
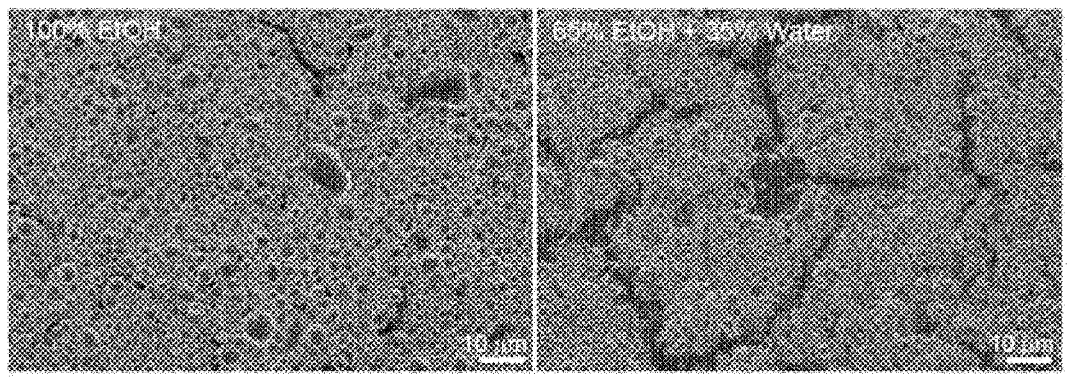
FIG. 16 illustrates scanning electron microscopic (SEM) images for evaporation patterns of the ink when a solvent including 100% ethanol and an ethanol aqueous solution including 65% ethanol and 35% water were used as a solvent of the ink.

As described above, the solvent may include an ethanol aqueous solution in which ethanol and water are mixed. FIG. 16 illustrates scanning electron microscopic (SEM) images for evaporation patterns of the ink when a solvent including 100% ethanol and an ethanol aqueous solution including 65% ethanol and 35% water were used as a solvent of the ink. In the case of an ethanol aqueous solution including 65% ethanol and 35% water, partially connected liquid metal paths are formed in the pattern. Due to the path formed in this way, the electrical conductivity of the pattern is maintained even for the liquid metal in which the sintering process is omitted, and the liquid metal path may be formed even in an ethanol aqueous solution including a small amount of water. However, in the case of pure ethanol which does not include water at all, such a path is not formed and electrical conductivity is lost. This suggests that the presence of a certain amount of water in the solvent is related to an effect of removing the oxide film. That is, when using the ethanol aqueous solution including a certain amount of water in the solvent, the oxide film may be removed more efficiently. In addition, when the concentration of ethanol is less than 30%, there is a disadvantage in that the evaporation of the solvent is slow, and when the concentration of ethanol exceeds 65%, the effect of removing the oxide film on the pattern after the ink evaporates is reduced. Therefore, it could be seen that the ethanol aqueous solution preferably includes ethanol in a concentration of 30 to 65%.

As described above, the solvent may include the ethanol aqueous solution in which ethanol and water are mixed, and in the present disclosure, an experiment was performed on three aqueous solutions including E30% in which 30% of ethanol and 70% of water were mixed, E65% in which 65% of ethanol and 35% of water were mixed, and E100% including 100% of ethanol.

According to a preferred feature of the present invention, in the step of removing the oxide film, a degree (X) of removing an oxide film from the liquid metal may be calculated by the following equation:

$$X = \frac{10^{-pH_{Dispersion\ medium}} - 10^{-pH_{Ink}}}{10^{-pH_{Dispersion\ medium}}}$$

(wherein, $10^{-pH_{Dispersion\ medium}}$ is a hydrogen ion concentration of a dispersion medium including the ethanol aqueous solution in which ethanol and water are mixed, and $10^{-pH_{Ink}}$ is a hydrogen ion concentration value of ink manufactured in a state in which liquid metal is dispersed into the ethanol aqueous solution in which ethanol and water are mixed).

First, [1] 10 mL of ethanol+water is a dispersion medium including only ethanol aqueous solution not liquid metal and corresponds to a control group, and [2] 10 mL of liquid metal ink according to an embodiment of the present invention corresponds to an experimental group. In order to compare the pH of the dispersion medium and the ink depending on the oxide film-removing treatment, when the acid was not input and when 20 µL, 50 µL, 100 µL, and 200 µL of acids (herein, hydrochloric acid was used) were used, pH values of the dispersion medium and the ink were measured, and results thereof are shown in Table 1 below.

TABLE 1

| | Ethanol concentration | Acid X | Acid 20 µL | Acid 50 µL | Acid 100 µL | Acid 200 µL | Note |
|---|---|---|---|---|---|---|---|
| [1] 10 mL of ethanol + water | E30% | 8.69 | 2.95 | 1.48 | — | — | Dispersion medium |
| | E65% | 8.76 | 2.14 | 1.62 | 1.38 | 1.02 | |
| | E100% | 8.63 | 2.12 | 0.33 | — | — | |
| [2] 10 mL of liquid metal ink | E30% | 4.67 | 3.02 | 2.71 | — | — | Ink |
| | E65% | 4.62 | 2.63 | 2.46 | 2.34 | 2.13 (No pattern completion) | |
| | E100% | 7.44 | 2.41 | 1.51 | — | — | |

When acid is added, a degree (X) of removing the oxide film of the dispersion medium and ink depending on the concentration of ethanol, that is, the value of X as an index indicating how much the oxide film of liquid metal has been removed may be calculated by the following equation.

$$X = \frac{10^{-pH_{Dispersion\ medium}} - 10^{-pH_{Ink}}}{10^{-pH_{Dispersion\ medium}}}$$

Wherein, $10^{-pH_{Dispersion\ medium}}$ means a hydrogen ion concentration of a dispersion medium ink including the ethanol aqueous solution in which ethanol and water are mixed, and $10^{-pH_{Ink}}$ means a hydrogen ion concentration value of ink manufactured in a state in which liquid metal is dispersed into an ethanol aqueous solution in which ethanol and water are mixed. Since the concentration of the hydrogen ion is decreased as a larger amount of the oxide film reacts with the input acid, the higher the value of X, the more the oxide film reacts. Herein, the X value becomes 0 when no hydrogen ions react, and the X value becomes 1 when all hydrogen ions react.

Based on the case of inputting 50 µL of acid, the X value is 0.941 upon E30%, and the X value is 0.856 upon E65%. From this, the liquid metal that has undergone the oxide film-removing treatment had calculated X of 0.856 to 0.941 when the concentration of ethanol aqueous solution was 30 to 65%, thus it could be seen that most of the oxide film was removed.

FIG. 5 is photographs for comparing pattern images of inks according to various ethanol aqueous solutions, in the method of manufacturing liquid metal ink according to an embodiment of the present invention.

As shown in FIG. 5, in the case of E100% including 100% of ethanol, there was a problem in that the ink not only spreads well on the substrate, but also sufficient liquid metal is not left due to a high evaporation rate. Next, in the case of E30% which is a 30% ethanol aqueous solution, there was a disadvantage in that the degree of spreading of the ink on the substrate is relatively small, but the evaporation rate is low, such that the liquid metal is thickly accumulated, and thereby reducing the completeness of the pattern. In the case of 65% ethanol aqueous solution in which 65% of ethanol and 35% of water are mixed, the most appropriate values were shown in terms of the evaporation rate and degree of spreading of the ink.

Figure 6:
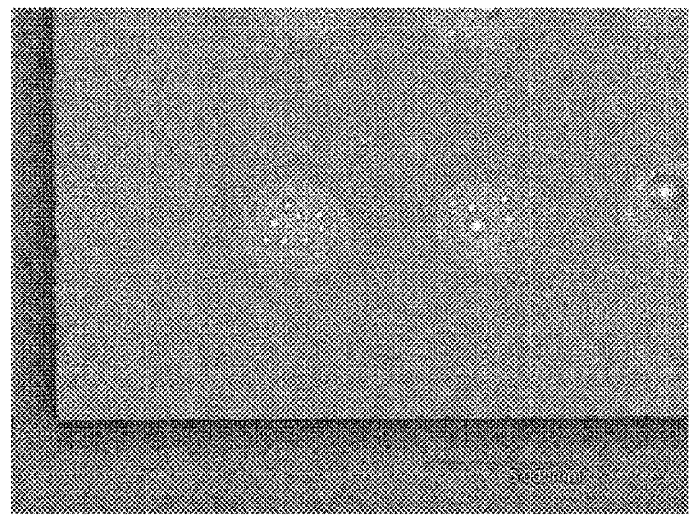
FIG. 6 is a photograph illustrating a case in which an acid is added in an excess amount, in the method of manufacturing liquid metal ink according to an embodiment of the present invention.

FIG. 6 is a photograph illustrating a case in which an acid is added in an excess amount, in the method of manufacturing liquid metal ink according to an embodiment of the present invention.

As the amount of acid added for the oxide film-removing treatment is increased, the pH is decreased, such that the oxide film may be effectively removed. However, when an excessive amount of acid is added, there is a problem in that the evaporation pattern of the ink is not completed and remains as liquid metal droplets. Accordingly, it could be seen that not only the evaporation rate and the degree of spreading of the ink on the substrate could be controlled according to a ratio of the ethanol in the solvent, but also the completeness of the pattern and the electrical conductivity were determined depending on the amount of the acid.

As another experimental example, in the case in which the oxide film-removing treatment process was performed on the 65% ethanol aqueous solution by inputting 20 μL, 30 μL, and 50 μL of acids into the dispersion medium of the control group [1], and ink of the experimental group [2], each pH value was calculated, and the obtained values are shown in Table 2 below.

TABLE 2

| E65% | 20 μL | 30 μL | 50 μL |
|---|---|---|---|
| [1] 10 mL of ethanol + water | 2.14 | 1.85 | 1.62 |
| [2] 10 mL of liquid metal ink | 2.63 | 2.5 | 2.46 |
| X | 0.6764 | 0.7761 | 0.8554 |
| Electrical conductivity | X | ○ | ○ |

Herein, with respect to the above-described X value indicating the degree of removing the oxide film from the liquid metal, when 20 μL of acid was added, the X value was 0.6764, but the pattern after the ink evaporation was not conducted in the energizing test. This means that the it is not electrically conducted without performing a sintering process because the oxide film formed on the liquid metal is not effectively removed due to a small amount of the acid. Next, it was confirmed that the X value was 0.7761 when 30 μL of acid was added, and at this time, the pattern was conducted in the energizing test. Accordingly, it is preferable that the X value indicating the degree of removing the oxide film from the liquid metal is 0.7 or more.

Figure 7:
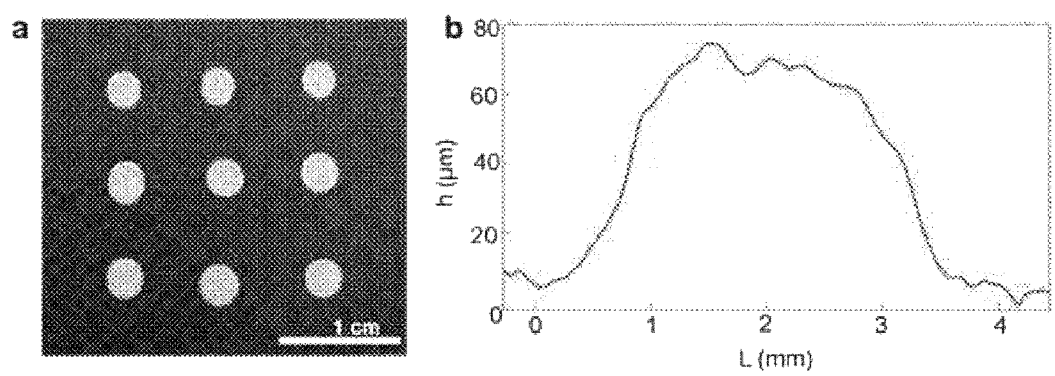
FIG. 7 is a photograph and graph illustrating a shape of liquid metal dropped on a foamex (foamed PVC) substrate, in the method of manufacturing liquid metal ink according to an embodiment of the present invention.

FIG. 7 is a photograph and graph illustrating a shape of liquid metal dropped on a foamex substrate, in the method of manufacturing liquid metal ink according to an embodiment of the present invention. When 3 μL of liquid metal was dropped on the foamex substrate and the 3D topology was measured, it could be seen that the pattern had a thickness of about 60 μm. Further, although it is known that the general evaporation pattern of the colloid including nanoparticles exhibits a coffee ring effect that an edge of the pattern is thick and uniformity of the pattern is decreased, a uniform pattern may be obtained from the pattern result of FIG. 5.

Figure 8:
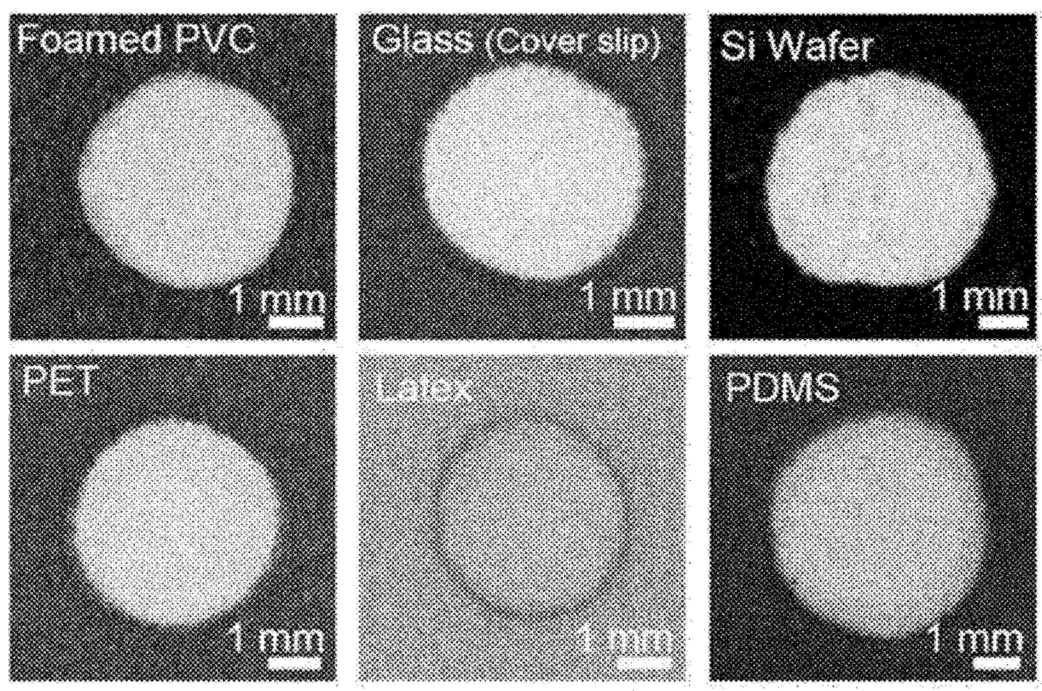
FIGS. 8 and 9 are photographs and a graph illustrating shapes of liquid metal when dropping it on various substrates, in the method of manufacturing liquid metal ink according to an embodiment of the present invention.
Figure 9:
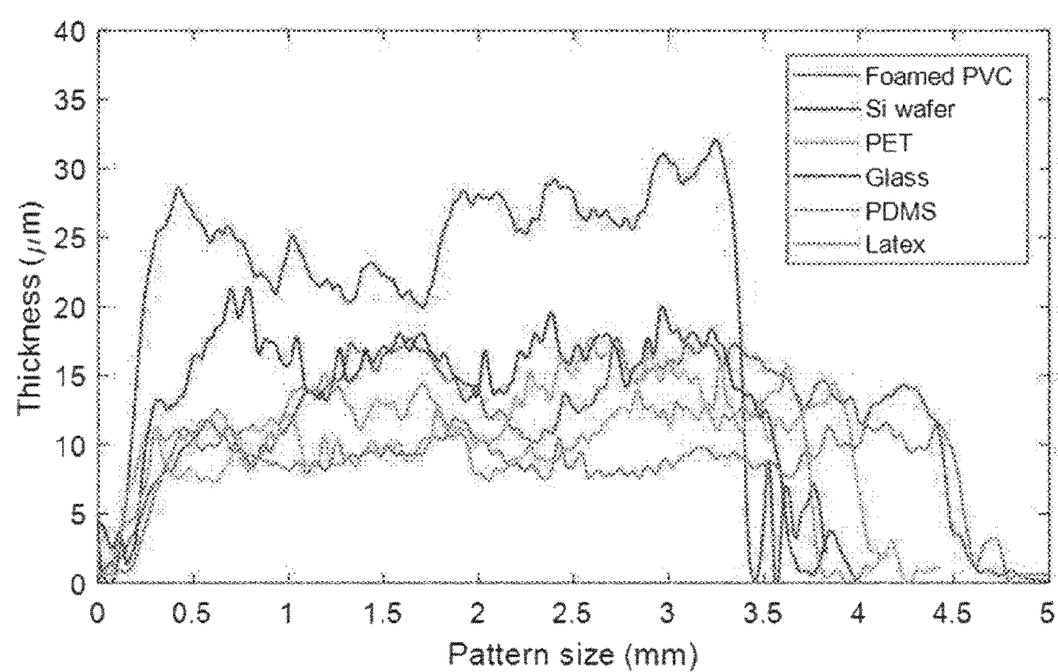

In addition, FIGS. 8 and 9 are photographs and a graph illustrating shapes of liquid metal when dropping it on various substrates. Similar to the experiment performed in FIG. 7, it can be seen that, when 5 μL of liquid metal was dropped on different substrates and the 3D topology was measured, the formed PVC substrate had a thickness of about 25 to 30 μm and the PDMS substrate had a thickness of about 10 μm. In particular, it can be seen that the coffee ring effect does not appear at the edge of the pattern and a uniform pattern is obtained.

Figure 10:
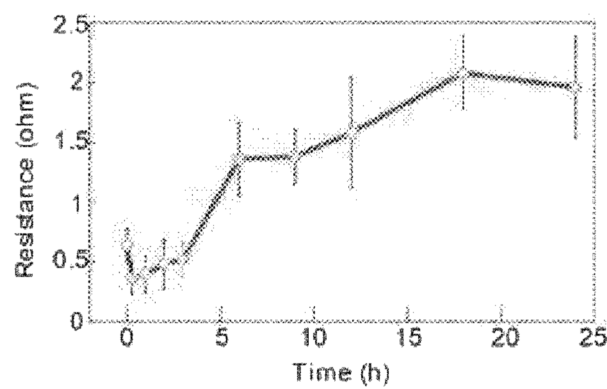
FIG. 10 is a resistance graph with respect to time from immediately after the ink pattern dries on the foamex substrate, in the method of manufacturing liquid metal ink according to an embodiment of the present invention.

FIG. 10 is a resistance graph with respect to time from immediately after the ink pattern dries on the foamex substrate, in the method of manufacturing liquid metal ink according to an embodiment of the present invention.

Herein, a resistance value was calculated from immediately after the evaporation was completed until 25 hours passed, but it can be seen that the electrical conductivity is sufficiently high because the resistance value is low at a level of several Ω.

Figure 11:
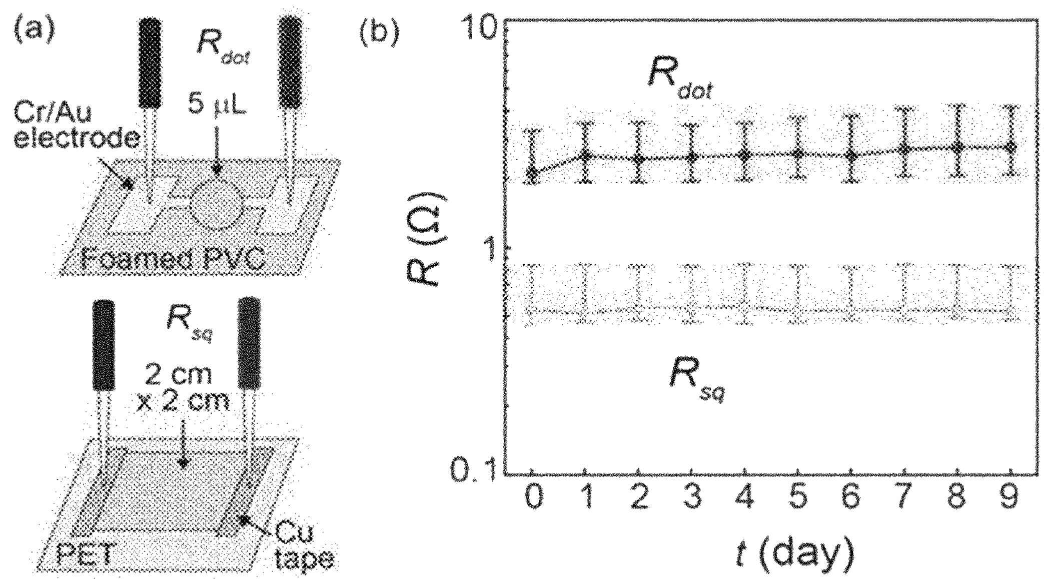
FIG. 11 is a view and a resistance graph with respect to time immediately after the ink pattern dries in a case in which Cr/Au electrodes are deposited on a foamed PVC and liquid metal ink is formed in a dot shape therebetween, and a case in which Cr/Au electrodes are deposited on a polyethylene terephthalate (PET) substrate and liquid metal ink is formed in a square shape therebetween, in the method of manufacturing liquid metal ink according to an embodiment of the present invention.

In addition, FIG. 11 is a view and a resistance graph with respect to time immediately after the ink pattern dries in a case in which Cr/Au electrodes are deposited on a foamed PVC and liquid metal ink manufactured according to the method of manufacturing liquid metal ink of an embodiment of the present invention is formed in a dot shape therebetween, and a case in which Cr/Au electrodes are deposited on a polyethylene terephthalate (PET) substrate and liquid metal ink is formed in a square shape therebetween. As a result of performing an experiment for about 10 days, it could be seen that the electrical conductivity was high because the resistance value did not become larger than the level of several Ω.

Figure 12:
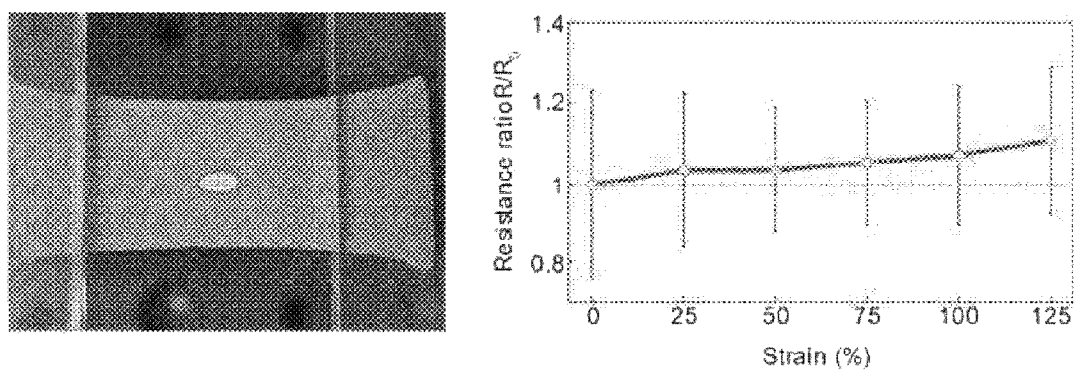
FIG. 12 is a photograph and graph illustrating a change in the resistance according to the tensile test in a state in which the ink is printed on the latex board, in the method of manufacturing liquid metal ink according to an embodiment of the present invention.

FIG. 12 is a photograph and graph illustrating a change in the resistance according to the tensile test in a state in which the ink is printed on the latex substrate, in the method of manufacturing liquid metal ink according to an embodiment of the present invention. Herein, the resistance of the pattern is increased by about 114% when comparing with the resistance before strain based on 0 to 125% of a strain rate (stretch rate) of the substrate. Considering the resistance of 2Ω or less in FIG. 6, it can be seen that the pattern maintains the resistance at the level of several Ω even on the stretched substrate.

Figure 13:
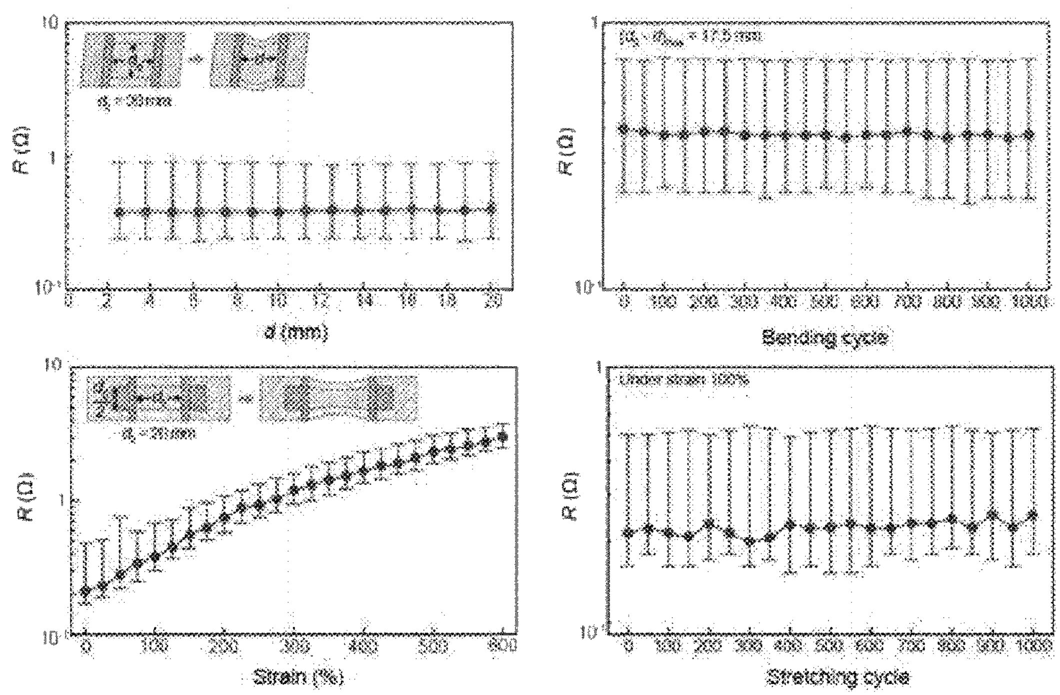
FIG. 13 is graphs illustrating the change in the resistance according to the bending and tensile tests in a state in which the ink manufactured by the method of manufacturing liquid metal ink according to an embodiment of the present invention is printed.

Further, FIG. 13 is graphs illustrating the change in the resistance according to the bending and tensile tests in a state in which the ink manufactured by the method of manufacturing liquid metal ink according to an embodiment of the present invention is printed. A pattern of 2 cm×2 cm on a PET substrate was used for bending, and a pattern of 4 cm×1 cm (free stretching area 2 cm×1 cm) on a PU substrate was used for stretching. In the case of the bending, the resistance was maintained almost constant, but in the case of the stretching, the initial resistance of 0.21Ω was increased by 14.2 times at 600% stretch rate, and from this result, it can be seen that the resistance is changed depending on the stretch rate.

Figure 14:
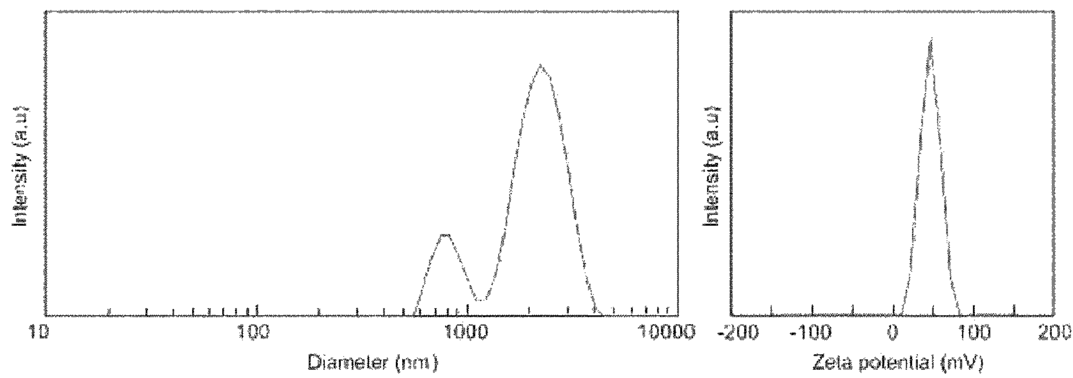
FIG. 14 is graphs for comparing a particle diameter and a zeta potential of the liquid metal ink, in the method of manufacturing liquid metal ink according to an embodiment of the present invention.

FIG. 14 is graphs for comparing a particle diameter and a zeta potential of the liquid metal ink, in the method of manufacturing liquid metal ink according to an embodiment of the present invention. The particle diameters of the ink were shown in a distribution of several hundred nm to several μm. In the present embodiment, a distribution having peaks of 715 nm and 2.2 μm was shown, but this distribution may vary depending on control of sonication power and time. Due to gallium ions, the zeta potential of the liquid metal ink had a positive voltage, and the zeta potential distribution exhibited the peak at around 50 mV. The zeta potential is related with the stability of a colloidal solution: when stability is good, a zeta potential of 40 mV or more is measured. Therefore, it can be seen that the liquid metal ink is a colloid with high stability.

Although preferred embodiments of the present invention have been described with reference to the accompanying drawings, the embodiments and drawings described and illustrated in the present disclosure are simply the most preferred embodiment and do not represent all the technical sprites of the present invention, and it will be understood that various modifications and equivalents may be made to take the place of the embodiments at the time of filling the present application. Thus, it is clear that the above-described embodiments are illustrative in all aspects and do not limit the present disclosure. The scope of the present disclosure is defined by the following claims rather than by the detailed description of the embodiment. It shall be understood that all modifications and embodiments conceived from the meaning and scope of the claims and their equivalents are included in the scope of the present disclosure.

The invention claimed is:

1. A method of manufacturing liquid metal ink comprising:
(a) inputting a solvent into liquid metal in a container at room temperature;
(b) performing oxide film-removing treatment on the liquid metal of step (a); and
(c) dispersing the liquid metal that has undergone step (b) in a form of nanoparticles through ultrasonic treatment,
wherein the solvent in the step (a) includes a 30 to 65% ethanol aqueous solution.

2. The method of manufacturing liquid metal ink according to claim 1, wherein in the step (b),
an acid is input into the liquid metal in the container.

3. The method of manufacturing liquid metal ink according to claim 2, further comprising inputting a surfactant or conductive polymer for preventing cracks of the liquid metal, after the step (a).

4. The method of manufacturing liquid metal ink according to claim 1, further comprising: primarily dispersing the liquid metal in a form of nanoparticles through ultrasonic treatment, after the step (a); and
re-dispersing the dispersed liquid metal through secondary ultrasonic treatment, after performing the step (b).

5. The method of manufacturing liquid metal ink according to claim 1, wherein in the step (b),
a degree (X) of removing an oxide film from the liquid metal is calculated by the following equation:

$$X = \frac{10^{-pH_{Dispersion\ medium}} - 10^{-pH_{Ink}}}{10^{-pH_{Dispersion\ medium}}}$$

(wherein, $10^{-pH_{Dispersion\ medium}}$ is a hydrogen ion concentration of a dispersion medium including an ethanol aqueous solution in which ethanol and water are mixed, and is $10^{-pH_{Ink}}$ is a hydrogen ion concentration value of ink manufactured in a state in which liquid metal is dispersed into an ethanol aqueous solution in which ethanol and water are mixed).

6. The method of manufacturing liquid metal ink according to claim 3, wherein the surfactant includes cetrimonium bromide (CTAB), lysozyme protein (Lys), or poly(4-vinyl-1-methyl-pyridinium bromide) (P4VMPB), and
the conductive polymer includes a poly(3,4-ethylenedioxythiophene)-polystyrenesulfonic acid (PEDOT-PSS) copolymer, or polypyrrole-polystyrenesulfonic acid (PPY-PSS) copolymer.

7. The method of manufacturing liquid metal ink according to claim 2, further comprising inputting polyvinylpyrrolidone to improve a coating quality of the liquid metal, after the step (a).

* * * * *